United States Patent
Yokomakura et al.

(10) Patent No.: US 9,531,462 B2
(45) Date of Patent: Dec. 27, 2016

(54) WIRELESS COMMUNICATION SYSTEM, WIRELESS TRANSMITTER, AND CONTROL PROGRAM FOR WIRELESS TRANSMITTER

(71) Applicant: SHARP KABUSHIKI KAISHA, Osaka-shi, Osaka (JP)

(72) Inventors: Kazunari Yokomakura, Osaka (JP); Yasuhiro Hamaguchi, Osaka (JP); Osamu Nakamura, Osaka (JP); Jungo Goto, Osaka (JP); Hiroki Takahashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 85 days.

(21) Appl. No.: 14/505,033

(22) Filed: Oct. 2, 2014

(65) Prior Publication Data
US 2015/0055596 A1    Feb. 26, 2015

Related U.S. Application Data (63) Continuation of application No. 13/255,519, filed as application No. PCT/JP2010/053536 on Mar. 4, 2010, now Pat. No. 8,886,138.

(30) Foreign Application Priority Data

Mar. 10, 2009  (JP) ................. 2009-056854

(51) Int. Cl.
*H04M 3/00*  (2006.01)
*H04B 7/04*  (2006.01)
(Continued)

(52) U.S. Cl.
CPC .......... *H04B 7/0478* (2013.01); *H04B 7/0623* (2013.01); *H04B 7/0689* (2013.01);
(Continued)

(58) Field of Classification Search
CPC ...... H04W 8/245; H04W 24/02; H04W 88/02; H04W 80/04; H04W 88/06; H04W 88/08; H04W 84/18; H04M 1/72525; H04M 1/72522
(Continued)

(56) References Cited

U.S. PATENT DOCUMENTS

| | | | |
|---|---|---|---|
| 6,366,763 B1 | 4/2002 | Ue et al. | |
| 7,095,709 B2 | 8/2006 | Walton et al. | |

(Continued)

FOREIGN PATENT DOCUMENTS

| | | |
|---|---|---|
| EP | 2 129 027 A1 | 12/2009 |
| JP | 2003-23659 A | 1/2003 |

(Continued)

OTHER PUBLICATIONS

3GPP TS 36.211 V8.5.0 (Dec. 2008) 3rd Generation Partnership Project; Technical Specification Group Radio Access Newtork; Evolved Universal Terrestrial Radio Access (E-UTRA); Physical Channels and Modulation, pp. 1-2 and 49-55.

(Continued)

*Primary Examiner* — Nhan Le
(74) *Attorney, Agent, or Firm* — Birch, Stewart, Kolasch & Birch, LLP (57) ABSTRACT

A mobile station transmitting transmission signals using one of a plurality of transmission schemes which includes at least a first transmission scheme and a second transmission scheme, where in a case that the used transmission scheme is the first transmission scheme, the transmission signals are applied by an open loop (OL) in which precoding information is not fed back and in a case that the used transmission scheme is the second transmission scheme, the transmission signals are applied by a closed loop (CL) for which a precoding matrix indicator (PMI) is fed back from the (Continued)

mobile station. The first peak-to-average power ratio (PAPR) characteristics of the first transmission scheme differs from the second PAPR characteristics of the second transmission scheme.

7 Claims, 8 Drawing Sheets

(51) Int. Cl.
| | | |
|---|---|---|
| *H04L 1/06* | (2006.01) | |
| *H04L 27/26* | (2006.01) | |
| *H04W 52/42* | (2009.01) | |
| *H04B 7/06* | (2006.01) | |
| *H04L 1/00* | (2006.01) | |
| *H04W 48/18* | (2009.01) | |
| *H04W 88/06* | (2009.01) | |
| *H04L 5/00* | (2006.01) | |

(52) U.S. Cl.
CPC .............. *H04L 1/0009* (2013.01); *H04L 1/06* (2013.01); *H04L 27/2614* (2013.01); *H04W 52/42* (2013.01); *H04B 7/068* (2013.01); *H04B 7/0671* (2013.01); *H04L 1/0003* (2013.01); *H04L 1/0071* (2013.01); *H04L 5/0023* (2013.01); *H04W 48/18* (2013.01); *H04W 88/06* (2013.01)

(58) Field of Classification Search
USPC ..................... 455/101, 418–420, 422.1, 561, 562.1,455/552.1, 126, 127.1; 370/328
See application file for complete search history.

(56) References Cited

U.S. PATENT DOCUMENTS

| | | |
|---|---|---|
| 7,907,511 B2 | 3/2011 | Kim et al. |
| 2002/0082039 A1 | 6/2002 | Ue et al. |
| 2003/0235147 A1 | 12/2003 | Walton et al. |
| 2004/0077378 A1 | 4/2004 | Kim et al. |
| 2005/0265280 A1 | 12/2005 | Roh et al. |
| 2006/0193268 A1 | 8/2006 | Walton et al. |
| 2008/0008276 A1 | 1/2008 | Yokoyama |
| 2008/0188192 A1 | 8/2008 | Chae et al. |
| 2009/0196272 A1 | 8/2009 | Tsutsui |
| 2009/0268841 A1 | 10/2009 | Kim et al. |
| 2010/0098009 A1 | 4/2010 | Higuchi |
| 2010/0165954 A1* | 7/2010 | Lin ...................... H04L 5/0007 370/335 |
| 2013/0083681 A1* | 4/2013 | Ebrahimi Tazeh Mahalleh ............ H04L 5/0057 370/252 |

FOREIGN PATENT DOCUMENTS

| | | |
|---|---|---|
| JP | 2005-531219 A | 10/2005 |
| JP | 2007-158483 A | 6/2007 |
| JP | 2008-236428 A | 10/2008 |
| WO | WO 2006/098008 A1 | 9/2006 |
| WO | WO 2008/032358 A1 | 3/2008 |

OTHER PUBLICATIONS

U.S. Final Office Action issued in U.S. Appl. No. 13/255,519 on Apr. 3, 2014.
U.S. Notice of Allowance issued in U.S. Appl. No. 13/255,519 on Jul. 16, 2014.
U.S. Office Action issued in U.S. Appl. No. 13/255,519 on Jul. 3, 2013.
U.S. Office Action issued in U.S. Appl. No. 13/255,519 on Oct. 30, 2013.
U.S. Restriction Requirement issued in U.S. Appl. No. 13/255,519 on May 7, 2013.

* cited by examiner

WIRELESS COMMUNICATION SYSTEM, WIRELESS TRANSMITTER, AND CONTROL PROGRAM FOR WIRELESS TRANSMITTER

This application is a Continuation of co-pending application Ser. No. 13/255,519 filed on Nov. 21, 2011, and for which priority is claimed under 35 U.S.C. §120, application Ser. No. 13/255,519 is the national phase of PCT International Application No. PCT/JP2010/053536 filed on Mar. 4, 2010 under 35 U.S.C. §371, which claims the benefit of priority of JP2009-056854 filed Mar. 10, 2009. The entire contents of each of the above-identified applications are hereby incorporated by reference.

TECHNICAL FIELD

The present invention relates to a technique of performing transmission diversity by selecting any one of plural kinds of transmission diversity schemes using at least two or more transmitting antennas.

BACKGROUND ART

A long term evolution (LTE) system which is a 3.9G wireless communication system of a cell-phone has been almost standardized, and an LTE-Advanced (LTE-A, which is also called an IMT-A) which is a 4G wireless communication system more advanced than the LTE system recently started to standardize by the 3rd Generation Partnership Project (3GPP). For an uplink (communication from a mobile station to a base station) of the LTE-A system, since the system has been further extended from the LTE system, a transmission diversity scheme using a plurality of transmitting antennas which has not been defined in an uplink of the LTE is scheduled to be defined in view of power consumption of the mobile station or the cost.

Meanwhile, a downlink (communication from the base station to the mobile station) of the LTE employs an orthogonal frequency division multiplexing (OFDM) scheme in which each subcarrier is independently modulated. Further, since the base station transmits a signal and thus a restriction to power consumption is weak, the transmission diversity scheme has been already defined. For example, when the number of transmitting antennas is two, a space frequency block code (SFBC) and a cyclic delay diversity (CDD) have been defined (for example, Non-Patent Document 1).

Figure 7:
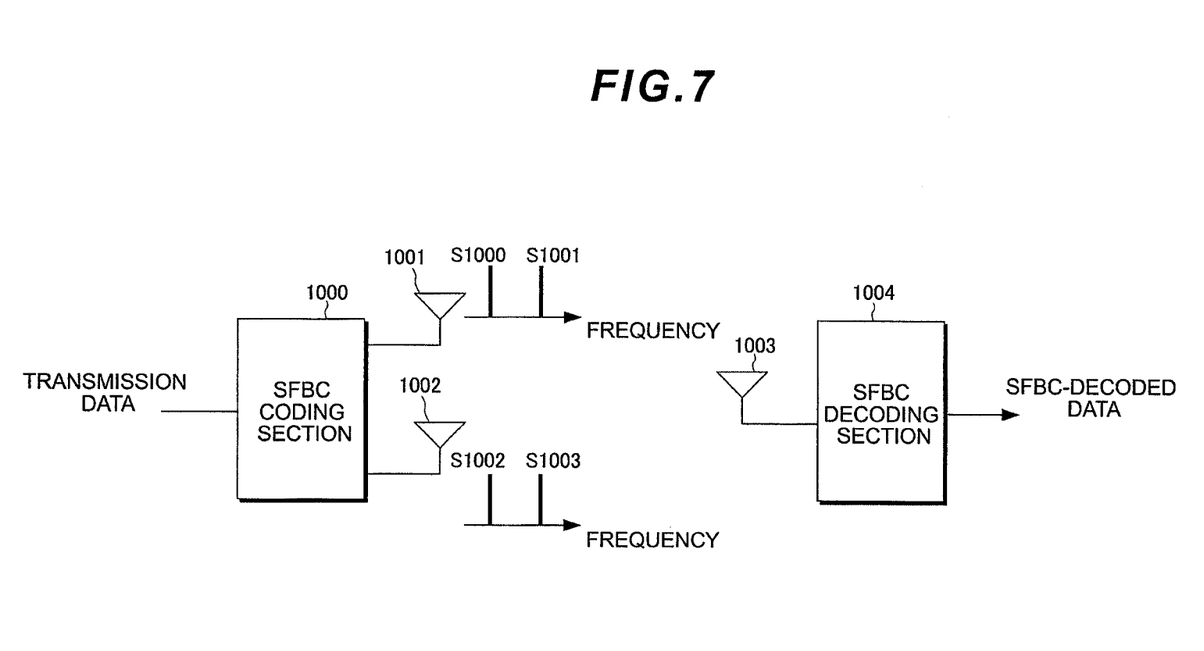
FIG. 7 is a diagram illustrating a concept of an SFBC.

FIG. 7 is a diagram illustrating a concept of the SFBC. Referring to FIG. 7, transmission data is subjected to SFBC coding by an SFBC coding section 1000 and transmitted from a transmitting antenna 1001 and a transmitting antenna 1002. In SFBC coding, for example, when two antennas are used, a subcarrier S1003 has a relation in which a minus is put to a complex conjugate of a subcarrier S1000, and a subcarrier S1001 and a subcarrier S1002 have a complex conjugate relation. That is, if the amplitude of a (2k−1)-th subcarrier input to original transmission data (the SFBC coding section 1000) is S(2k−1), and the amplitude of a 2k-th subcarrier is S(2k), the amplitudes of the subcarrier S1000 to the subcarrier S1003 are represented by the following equations.

[Equation 1]
$$S_1(2k-1) = S(2k-1) \quad (1)$$

[Equation 2]
$$S_1(2k) = S(2k) \quad (2)$$

[Equation 3]
$$S_2(2k-1) = -S^*(2k) \quad (3)$$

[Equation 4]
$$S_2(2k) = S^*(2k-1) \quad (4)$$

Here, S1(2k−1) and S1(2k) are the amplitudes represented by complex numbers of (2k−1)-th and 2k-th subcarriers transmitted from the transmitting antenna 1001, and S2(2k−1) and S2(2k) are the amplitudes of (2k−1)-th and 2k-th subcarriers transmitted from the transmitting antenna 1002.

The transmission signal transmitted as described above is received by a receiving antenna 1003, and SFBC-decoded data is extracted by an SFBC decoding section 1004. If complex gains of a channel of the transmitting antenna 1001 to the receiving antenna 1003 in the (2k−1)-th and 2k-th subcarriers are H1(2k−1) and H1(2k), and complex gains of a channel of the transmitting antenna 1002 to the receiving antenna 1003 in the (2k−1)-th and 2k-th subcarriers are H2(2k−1) and H2(2k), receiving signals R(2k−1) and R(2k) are represented by the following equations.

[Equation 5]
$$R(2k-1) = H_1(2k-1)S(2k-1) + H_2(2k-1)S^*(2k) \quad (5)$$

[Equation 6]
$$R(2k) = H_1(2k)S(2k) - H_2(2k)S^*(2k-1) \quad (6)$$

When S(2k−1) and S(2k) are expressed by the receiving signals in view of Equations 5 and 6, the following equation is derived. Actually, noise from a receiving device or interference from a neighboring cell is included, but a description thereof is herein omitted for simplifying a description.

[Equation 7]
$$H^*_1(2k-1)R(2k-1) - H_2(2k)R^*(2k) = (|H_1(2k-1)|^2 + |H_2(2k)|^2)S(2k-1) + (H^*_1(2k-1)H_2(2k-1) - H^*_1(2k)H_2(2k))S^*(2k) \quad (7)$$

[Equation 8]
$$H_2(2k-1)R^*(2k-1) + H^*_1(2k)R(2k) = (|H_2(2k-1)|^2 + |H_1(2k)|^2)S(2k) + (H^*_1(2k-1)H_2(2k-1) - H^*_1(2k)H_2(2k))S^*(2k-1) \quad (8)$$

In Equations 7 and 8, when the subcarrier "2k−1" is almost the same in channel gain as the subcarrier 2k (a variation is sluggish), it can be regarded that H1(2k−1) is equal to H1(2k), and H2(2k−1) is equal to H2 (2k). Thus, in this case, the second terms of the right sides of Equations 7 and 8 become zero, and thus it is possible to obtain an effect of maximum ratio combining (MRC) in which the magnitudes of channel gains from the transmitting antennas are weighted and combined.

Figure 8:
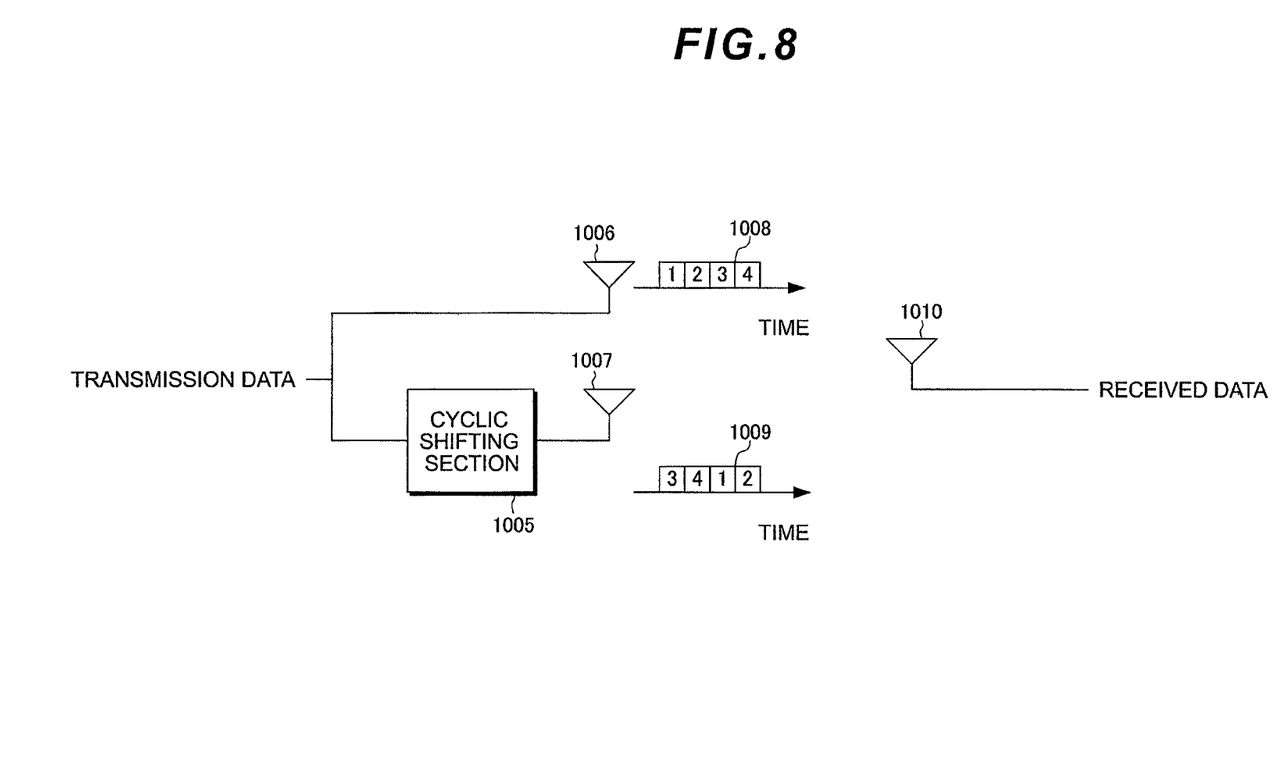
FIG. 8 is a diagram illustrating an example of a CDD.

FIG. 8 is a diagram illustrating an example of the CDD. In the case of the CDD shown in FIG. 8, when two transmitting antennas are used, only one antenna includes a cyclic shift section 1005. Further, a transmitting signal 1009 from a transmitting antenna 1007 is cyclic-shifted by the cyclic shifting section 1005 compared to a transmitting signal 1008 transmitted from a transmitting antenna 1006 and shifted by two symbols compared to the transmitting signal 1008. At a receiving side, signals from all transmitting antennas are added and received by a receiving antenna 1010. Since the receiving side regards that the transmitting signal from the transmitting antenna 107 has been shifted by the number of symbols cyclic-shifted by the channel, a maximum delay time of an impulse response of the channel equivalently increases. For this reason, by increasing a frequency variation, a frequency having a good channel gain is mixed with a frequency having a bad channel gain. Thus, the entire signal band is prevented from dipping into a frequency band having a bad channel gain. Performance of the SFBC level is not shown, but it is effective at the time of moving at a high speed or when a variation in the channel cannot be expected at all.

CITATION LIST

Non-Patent Document

[Non-Patent Document 1] 3GPP TS 36.211, v 8.5.0

DISCLOSURE OF THE INVENTION

Problem to be Solved by the Invention

However, in the uplink of the LTE, a transmission technique that is low in peak power is desirable. It is because in a transmission technique that is high in peak power, a linear area of an amplifier is exceeded, and thus a transmitting signal is distorted. Thus, the LTE and the LTE-A employ a transmission technique that is low in peak power such as a single carrier frequency division multiple access (SC-FDMA) technique or a clustered discrete Fourier transform spread (DFT-S) OFDM. However, since the SFBC switches the subcarrier sequence, the peak power rises. As a result, the transmission power has to decrease as much as the peak power increases, and thus it is not suitable for a mobile station that needs the high transmission power as in a cell edge.

The present invention is made in light of the foregoing, and it is an object of the present invention to provide a wireless communication system, a wireless transmitter, and a control program for a wireless transmitter which are capable of effectively performing transmission diversity of the uplink by switching transmission diversity schemes according to necessary transmission power in the uplink.

Means for Solving Problem (1) In order to achieve the above object, the present invention takes the following means. That is, a wireless communication system of the present invention includes a first communication device that includes at least two or more transmitting antennas, selects any one of plural kinds of transmission diversity schemes, and performs transmission diversity, and a second communication device that performs wireless communication with the first communication device, wherein the first communication device selects any one of the plural kinds of transmission diversity schemes based on transmission power.

Since any one of the plural kinds of transmission diversity schemes is selected based on transmission power as described above, the transmission diversity scheme that is high in peak power can be switched to the transmission diversity scheme that is not high in peak power, and thus it is possible to increase the transmission efficiency of the system.

(2) Further, in the wireless communication system of the present invention, the first communication device selects the transmission diversity scheme based on an index representing the magnitude of peak power.

Since the first communication device selects the transmission diversity scheme based on the index representing the magnitude of peak power as described above, it is possible to select the appropriate transmission diversity scheme according to the transmission power, and it is possible to increase the transmission efficiency of the system.

(3) Further, in the wireless communication system of the present invention, the index representing the magnitude of the peak power is a cubic metric (CM) or a peak-to-average power ratio (PAPR).

Since the index representing the magnitude of the peak power is the cubic metric (CM) or the peak-to-average power ratio (PAPR) as described above, the transmission diversity scheme is selected based on the index, it is possible to select the appropriate transmission diversity scheme according to the transmission power, and it is possible to increase the transmission efficiency of the system.

(4) Further, in the wireless communication system of the present invention, the first communication device selects the transmission diversity scheme based on at least one of power headroom calculated when the transmission power is decided, the CM, and the PAPR.

Since the first communication device selects the transmission diversity scheme based on at least one of power headroom calculated when the transmission power is decided, the CM, and the PAPR as described above, it is possible to select the appropriate transmission diversity scheme according to the transmission power, and it is possible to increase the transmission efficiency of the system.

(5) Further, in the wireless communication system of the present invention, the first communication device selects the transmission diversity scheme based on frequency allocation used for transmission.

Since the first communication device selects the transmission diversity scheme based on frequency allocation used for transmission as described above, information for selecting the transmission diversity is unnecessary. As a result, it is possible to perform the efficient transmission diversity without influencing the control information of the system.

(6) Further, a wireless communication system of the present invention includes a first communication device that includes at least two or more transmitting antennas, selects any one of plural kinds of precoding schemes, and performs precoding, and a second communication device that performs wireless communication with the first communication device, wherein the first communication device selects any one of the plural kinds of precoding schemes based on frequency allocation used for transmission.

Since the first communication device selects any one of the plural kinds of precoding schemes based on frequency allocation used for transmission as described above, the precoding scheme that is high in peak power can be switched to the precoding scheme that is not high in peak power, and thus it is possible to increase the transmission efficiency of the system.

(7) Further, a wireless transmitter of the present invention includes at least two or more transmitting antennas, selects anyone of plural kinds of transmission diversity schemes, and performs transmission diversity, and includes a transmission power deciding section that decides transmission power based on information notified from a receiver which is a transmission destination, a transmission diversity scheme selecting section that selects anyone of the plural kinds of transmission diversity schemes based on the decided transmission power, and a transmitting section that performs wireless transmission to the receiver through the selected transmission diversity scheme.

Since any one of the plural kinds of transmission diversity schemes is selected based on transmission power as described above, the transmission diversity scheme that is high in peak power can be switched to the transmission diversity scheme that is not high in peak power, and thus it is possible to increase the transmission efficiency of the system.

(8) Further, in the wireless transmitter of the present invention, the transmission diversity scheme selecting section selects the transmission diversity scheme based on an index representing the magnitude of peak power.

Since the transmission diversity scheme is selected based on the index representing the magnitude of peak power as described above, it is possible to select the appropriate transmission diversity scheme according to the transmission power, and it is possible to increase the transmission efficiency of the system.

(9) Further, in the wireless transmitter of the present invention, the index representing the magnitude of the peak power is a cubic metric (CM) or a peak-to-average power ratio (PAPR).

Since the index representing the magnitude of the peak power is the cubic metric (CM) or the peak-to-average power ratio (PAPR) as described above and the transmission diversity scheme is selected based on the index, it is possible to select the appropriate transmission diversity scheme according to the transmission power, and it is possible to increase the transmission efficiency of the system.

(10) Further, in the wireless transmitter of the present invention, the transmission power deciding section outputs power headroom calculated when the transmission power is decided to the transmission diversity scheme selecting section, and the transmission diversity scheme selecting section selects the transmission diversity scheme based on at least one of the power headroom, the CM, and the PAPR.

Since the transmission diversity scheme is selected based on at least one of the power headroom calculated when the transmission power is decided, the CM, and the PAPR as described above, it is possible to select the appropriate transmission diversity scheme according to the transmission power, and it is possible to increase the transmission efficiency of the system.

(11) Further, the wireless transmitter of the present invention further includes a detecting section that detects frequency allocation used for transmission based on information notified from a receiver that is a transmission destination, and the transmission diversity scheme selecting section selects the transmission diversity scheme based on the detected frequency allocation.

Since the transmission diversity scheme is selected based on frequency allocation used for transmission as described above, information for selecting the transmission diversity is unnecessary. As a result, it is possible to perform the efficient transmission diversity without influencing the control information of the system.

(12) Further, a wireless transmitter of the present invention includes at least two or more transmitting antennas, selects any one of plural kinds of precoding schemes, and performs precoding, and includes a detecting section that detects frequency allocation used for transmission based on information notified from a receiver that is a transmission destination and a precoding scheme selecting section that selects any one of the plural kinds of precoding schemes based on the decided frequency allocation.

Since any one of the plural kinds of precoding schemes is selected based on frequency allocation used for transmission as described above, the precoding scheme that is high in peak power can be switched to the precoding scheme that is not high in peak power, and thus it is possible to increase the transmission efficiency of the system.

(13) Further, a control program for a wireless transmitter according to the present invention is a control program for a wireless transmitter that includes at least two or more transmitting antennas, selects any one of plural kinds of transmission diversity schemes, and performs transmission diversity, the control program being commands expressed in a computer readable and executable form so as for a computer to perform a series of processes including: at a transmission power deciding section, deciding transmission power based on information notified from a receiver which is a transmission destination; at a transmission diversity scheme selecting section, selecting any one of the plural kinds of transmission diversity schemes based on the decided transmission power; and at a transmitting section, performing wireless transmission to the receiver through the selected transmission diversity.

Since any one of the plural kinds of transmission diversity schemes is selected based on transmission power as described above, the transmission diversity scheme that is high in peak power can be switched to the transmission diversity scheme that is not high in peak power, and thus it is possible to increase the transmission efficiency of the system.

Effect of the Invention

According to the present invention, since any one of plural kinds of transmission diversity schemes is selected based on transmission power, a transmission diversity scheme that is high in peak power can be switched to a transmission diversity scheme that is not high in peak power, and thus it is possible to increase transmission efficiency of a system.

BEST MODE(S) FOR CARRYING OUT THE INVENTION

Hereinafter, embodiments of the present invention will be described with reference to the accompanying drawings. In the following embodiments, the SFBC and the CDD are switched, but a form in which a scheme in which the peak power rises (for example, FSTD in which a wave form is divided) is also switched to a transmission diversity scheme in which the peak power does not rise (for example, STBC, TSTD, or FSTD of reducing the number of DFT points) is included in the present invention. In the following embodiment, the transmission diversity is applied to the SC-FDMA scheme, but a scheme such as the clustered DFT-S-OFDM scheme may be used.

[First Embodiment]

Figure 1:
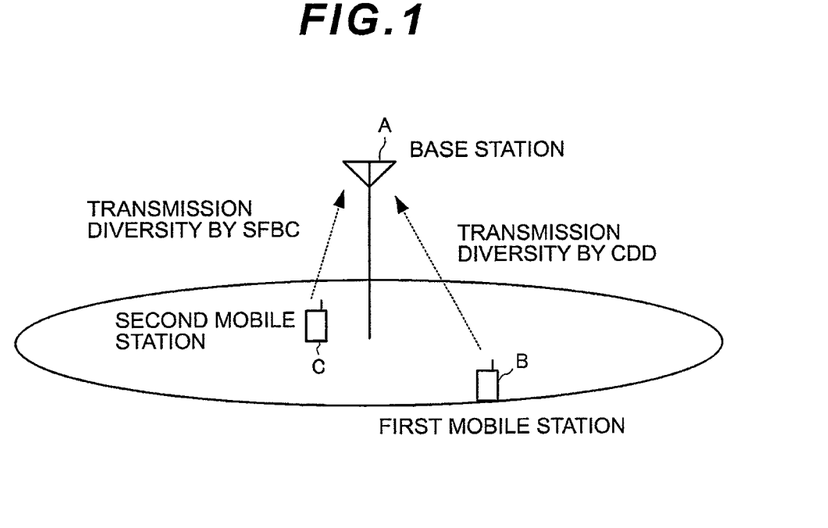
FIG. 1 is a diagram illustrating an overview of a wireless communication system according to a first embodiment.

FIG. 1 is a diagram illustrating an overview of a wireless communication system according to a first embodiment. In FIG. 1, as a system, illustrated is a wireless communication system of the uplink, which includes a base station A, a first mobile station B, and a second mobile station C. Since the mobile station B is far from the base station A, when a transmission scheme having high peak power is used, a desired reception quality may not be obtained. Further, the second mobile station C is relatively close to the base station A, even when a transmission scheme having high peak power is used, communication can be performed at a desired quality without influencing a transmission amplifier.

In this case, in view of the transmission performance and the peak power, a transmission diversity scheme in which the peak power does not rise is suitable for the first mobile station B, and a transmission diversity scheme capable of obtaining the maximum ratio combining gain is suitable for the second mobile station C. As described above, in the present embodiment, the transmission diversity in which the peak power rises such as the SFBC is applied to the mobile station close to the base station, and the transmission diversity scheme in which the peak power does not increase such as the CDD is applied to the mobile station far from the base station.

By selecting the transmission diversity scheme to be applied to the mobile station according to the distance from the base station, that is, the necessary transmission power as described above, it is possible to provide an effective wireless communication system in which the power usage efficiency and the transmission performance are considered.

Figure 2:
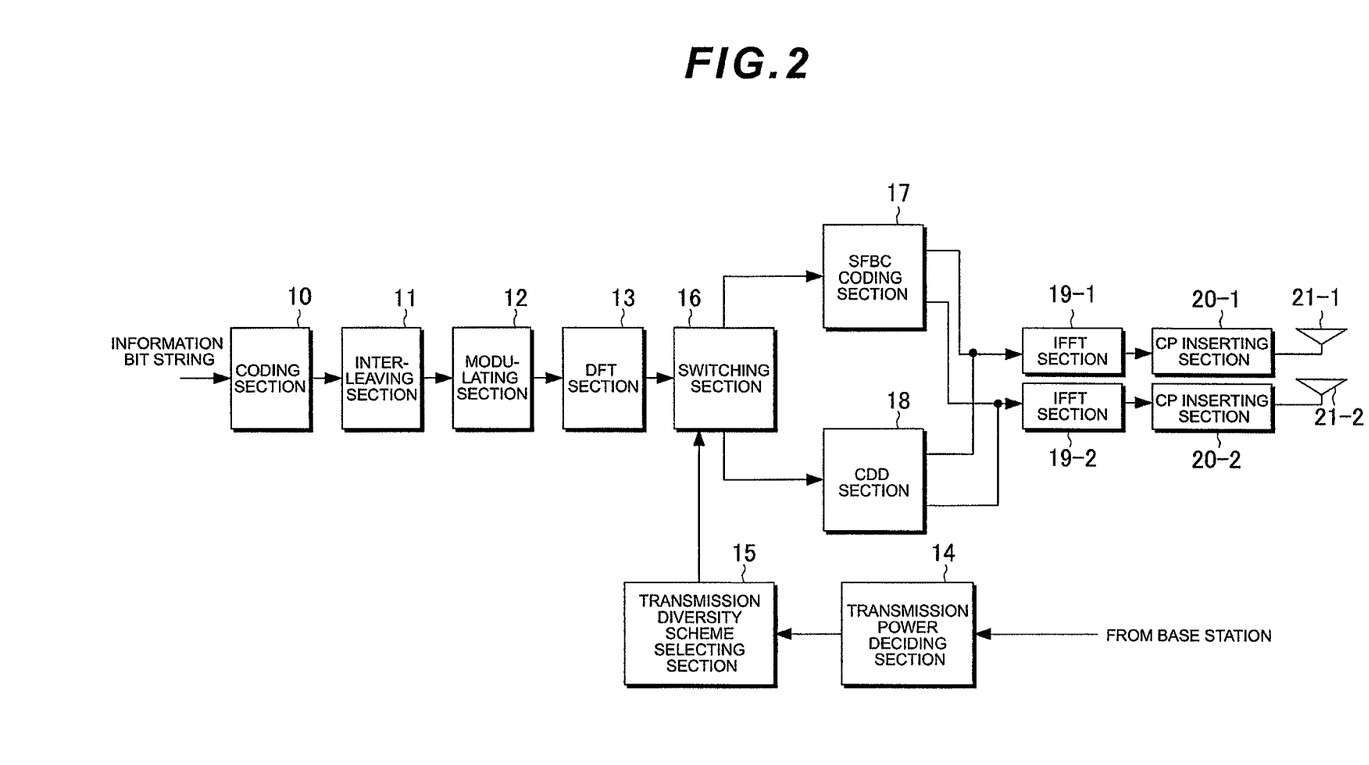
FIG. 2 is a diagram illustrating a schematic configuration of a mobile station that switches an SFBC and a CDD to each other.

FIG. 2 is a diagram illustrating a schematic configuration of a mobile station that switches the SFBC and the CDD to each other. Referring to FIG. 2, the mobile station includes a coding section 10, an interleaving section 11, a modulating section 12, a DFT section 13, a transmission power deciding section 14, a transmission diversity scheme selecting section 15, a switching section 16, an SFBC coding section 17, a CDD section 18, an IFFT sections 19-1 and 19-2, CP inserting sections 20-1 and 20-2, and transmitting antennas 21-1 and 21-2.

An information bit string to be transmitted is subjected to error correction coding by the coding section 10, and a serial sequence of bits is interleaved by the interleaving section 11. The bit string output from the interleaving section 11 is modulated by the modulating section 12, and thus a modulation signal that conforms to a quaternary phase shift keying (QPSK) or a 16 quadrature amplitude modulation (QAM) is output. The output modulation signal is transformed into a frequency signal by the DFT section 13.

Meanwhile, the transmission power deciding section 14 calculates transmission power necessary for communication based on information related to the transmission power notified from the base station which will be described later, and the transmission diversity scheme selecting section 15 selects a transmission diversity scheme according to the transmission power. Here, the transmission diversity scheme selecting section 15 selects the transmission diversity scheme based on the peak power such as a cubic metric (CM) or a peak-to-average power ratio (PAPR) which is an index representing the magnitude of the peak power. Information representing the selected transmission diversity scheme is input to the switching section 16. The frequency signal input from the DFT section 13 to the switching section 16 is input to any one of the SFBC coding section 17 and the CDD section 18 according to the selected transmission diversity scheme.

Cyclic shifting of a time domain has been used for the description in FIG. 8, but processing of the CDD is herein implemented by rotating a phase of each subcarrier which is equivalent to cyclic shifting of the time domain. Further, even in cyclic shifting, phase rotation of the subcarrier is also physically equivalent. A signal output from the SFBC coding section 17 or the CDD section 18 is transformed into a temporal signal by the IFFT section 19-1 or 19-2, a cyclic prefix (CP) is inserted by the CP inserting section 20-1 or 20-2, and then a signal output from the CP inserting section 20-1 or 20-2 is transmitted through the transmitting antenna 21-1 or 21-2.

Figure 3:
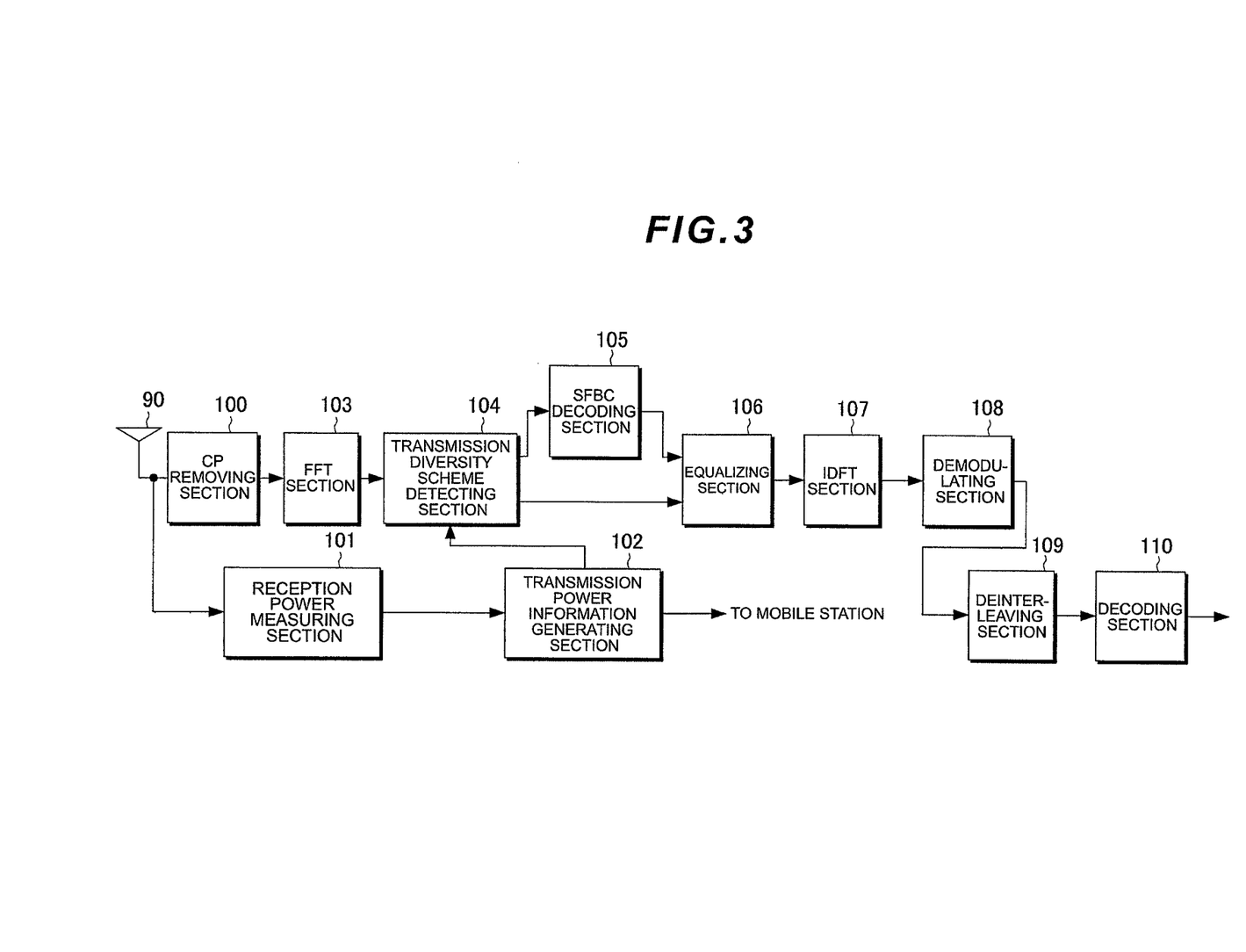
FIG. 3 is a diagram illustrating a schematic configuration of a base station.

FIG. 3 is a diagram illustrating a schematic configuration of a base station. The base station includes a receiving antenna 90, a CP removing section 100, a reception power measuring section 101, a transmission power information generating section 102, a FFT section 103, a transmission diversity scheme detecting section 104, an SFBC decoding section 105, an equalizing section 106, an IDFT section 107, a demodulating section 108, a deinterleaving section 109, and a decoding section 110.

A receiving signal is received by the receiving antenna 90, and a CP is removed by the CP removing section 100. At the same time, reception power is measured by the reception power measuring section 101, and the measured reception power is then input to the transmission power information generating section 102. The transmission power information generating section 102 generates information related to the transmission power at which the mobile station has to perform transmission and notifies the mobile station of the information related to the transmission power. At the same time, the information related to the transmission power is output to the transmission diversity scheme detecting section 104 for signal detection.

Meanwhile, the receiving signal from which the CP has been removed is transformed into a frequency signal by the FFT section 103 and then input to the transmission diversity scheme detecting section 104. The transmission diversity scheme detecting section 104 detects the transmission diversity scheme used by the mobile station using a value of the necessary transmission power generated by the transmission power information generating section 102. The transmission diversity scheme detecting section 104 outputs an output signal to the SFBC decoding section 105 when the transmission diversity scheme is the SFBC and outputs an output signal to the equalizing section 106 when the transmission diversity scheme is the CDD. When the mobile station performs transmission by the SFBC, a signal from each transmitting antennas is detected by the SFBC decoding section 105 and then input to the equalizing section 106 that removes distortion of the transmitting signal. In the case of the CDD, since a combining process of the recessing process is not necessary, the signal is input to the equalizing section 106 "as is", and distortion caused by the channel is compensated.

A signal equalized by the equalizing section 106 is transformed into a temporal signal by the IDFT section 107. The temporal signal is input to the demodulating section 108, so that a receiving code bit is detected from the modulation symbol. The demodulated code bit is restored to a serial sequence of code bits by the deinterleaving section 109, and error correction decoding is performed by the decoding section 110, so that decoded data is obtained.

Here, it has been described that the transmission power information generating section 102 generates the information related to the transmission power information, but it is because a configuration in which the base station decides the transmission power has been employed. Meanwhile, in the LTE, since the mobile station notifies the base station of information representing how much margin of transmission power of the mobile station has which is called power headroom, the mobile station may set the transmission diversity in view of the value. In this case, the transmission power deciding section 14 of FIG. 2 calculates the power headroom, the mobile station notifies the base station of the power headroom, and the base station detects the power headroom and detects the transmission diversity scheme through the transmission diversity scheme detecting section 104.

The power headroom is a relative value through which the mobile station notifies the base station of how much the transmission power can increase, and by using the value, it is possible to determine whether or not transmission can be performed without lowering the transmission power when the SFBC is applied, based on the CM or the PAPR. This concept is also included in the present invention.

Further, in the present invention, a configuration example of the single carrier in which two transmitting antennas are arranged has been described, but a scheme such as the clustered DFT-S-OFDM or a case in which three or more transmitting antennas are arranged is also included in the present invention.

As described above, according to the present invention, the transmission diversity scheme in which the transmission performance is excellent but the peak power rises like the SFBC and the CDD scheme in which the peak power does not rise are switched according to the transmission power, and thus it is possible to increase the transmission efficiency of the system.

[Second Embodiment]

Next, a second embodiment will be described. It has been decided that the SC-FDMA and the clustered DFT-S-OFDM are applied to the uplink of the LTE-A. Generally, when the peak power needs be lowered as much as possible as in the mobile station positioned at the cell edge, the SC-FDMA is applied. Further, when there is a margin in transmission power as in the mobile station positioned at the position close to the base station, the clustered DFT-S-OFDM is applied. Since the clustered DFT-S-OFDM divides the spectrum (a frequency signal) of the SC-FDMA to dispersively arrange it according to a frequency characteristic or an allocation state of the another mobile station, it has the peak power higher than the SC-FDMA. That is, the clustered DFT-S-OFDM is applied to the mobile station having had the enough transmission power, and in this case, since the transmission of power is not considered to be limited, the transmission diversity such as the SFBC can be applied.

Figure 4:
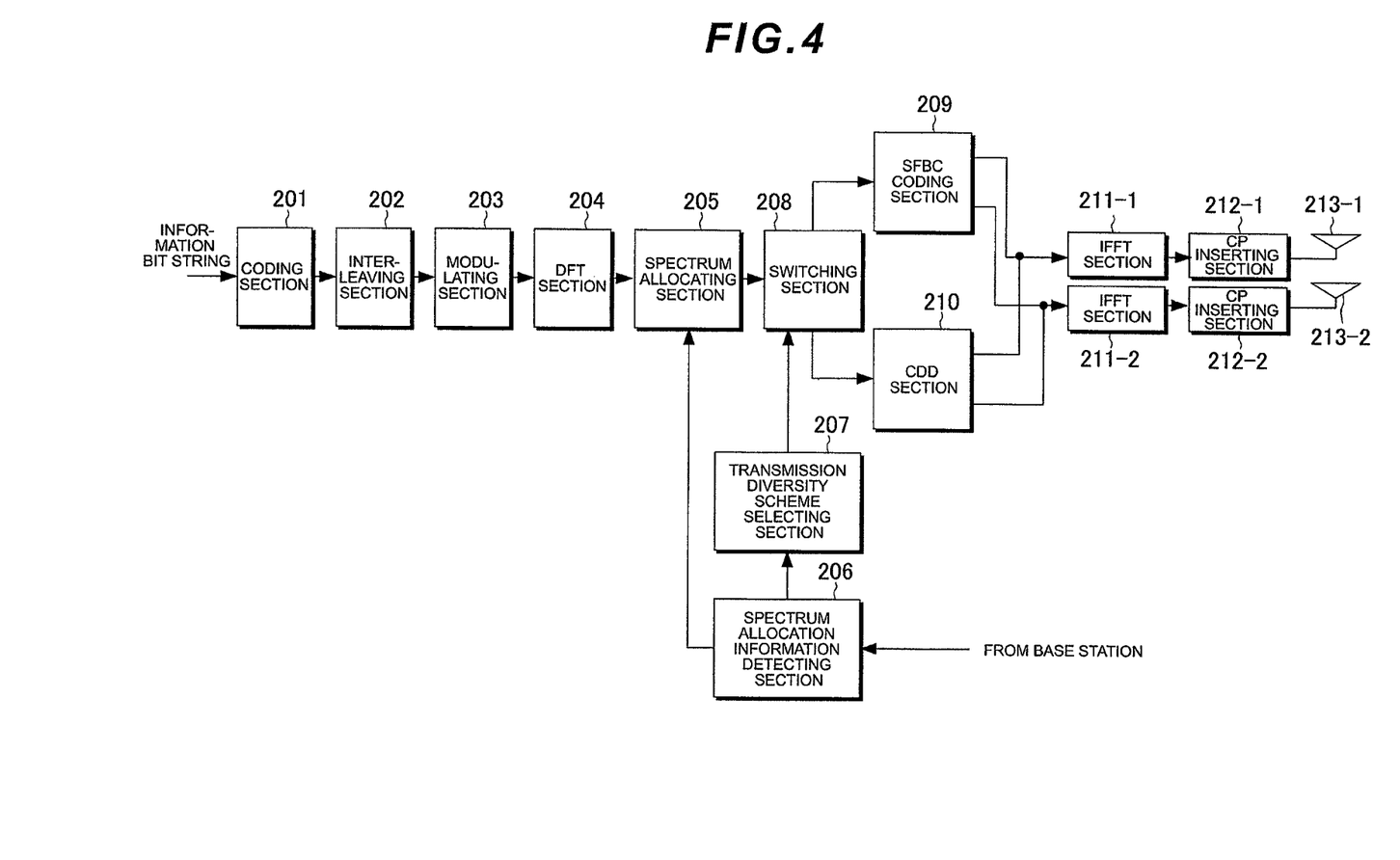
FIG. 4 is a diagram illustrating a schematic configuration of a mobile station according to a second embodiment.

FIG. 4 is a diagram illustrating a schematic configuration of a mobile station according to the second embodiment. The mobile station includes a coding section 201, an interleaving section 202, a modulating section 203, a DFT section 204, a spectrum allocating section 205, a spectrum allocation information detecting section 206, a transmission diversity scheme selecting section 207, a switching section 208, an SFBC coding section 209, a CDD section 210, IFFT sections 211-1 and 211-2, CP inserting sections 212-1 and 212-2, and transmitting antennas 213-1 and 213-2. The coding section 201, the interleaving section 202, the modulating section 203, the DFT section 204, the switching section 208, the SFBC coding section 209, the CDD section 210, the IFFT sections 211-1 and 211-2, the CP inserting sections 212-1 and 212-2, and the transmitting antennas 213-1 and 213-2 are the same as in the first embodiment, and hence a description thereof will not be repeatedly given.

The spectrum allocating section 205 arranges signals based on frequency allocation information. The spectrum allocation information detecting section 206 detects information representing whether to arrange signals in a frequency notified from the base station. For example, in the LTE and the LTE-A, the information is detected from a physical downlink control channel (PDCCH). At this time, when the signals are consecutively arranged, the information represents the SC-FDMA scheme, and when the signals are dispersedly arranged, the information represents the clustered DFT-S-OFDM. This is recognized by the transmission diversity scheme selecting section 207. When it is judged as the clustered DFT-S-OFDM, the SFBC is selected, and when it is judged as the SC-FDMA, the CDD is selected. The judgment result is input to the switching section 208.

Even though not shown in the first embodiment, even only in the SC-FDMA, the information related to spectrum allocation has been already specified in the LTE so as to allow the base station to perceive which frequency band is consecutively allocated with signals and is notified through the PDCCH. In the present embodiment, when a transmission scheme is detected, the transmission diversity can be switched without needing information related to switching. Thus, the efficient transmission diversity can be applied without influencing the control information of the system. Based on the same concept, by including information in the amplitude, the same way of thinking is similarly possible, for example, even in 16QAM in which the peak power increases. In the case of the QPSK, switching such as the CDD is possible, and in the case of 16QAM or more, switching such as the SFBC is possible. Thus, this form is also included in the present invention.

[Third Embodiment]

In this embodiment, a description will be made in connection with a technique for switching precoding. In the uplink of the LTE, a multiple-input multiple-output (MIMO) has been defined separately from the transmission diversity. Generally, in the MIMO technique, a signal is spatially multiplexed by transmitting different signals with each transmission antenna using a plurality of transmitting antennas, and at a receiving side, each stream is detected by solving a simultaneous linear equation on the premise that receiving antennas which are more in number than the multiplexed signals are arranged.

Figure 5:
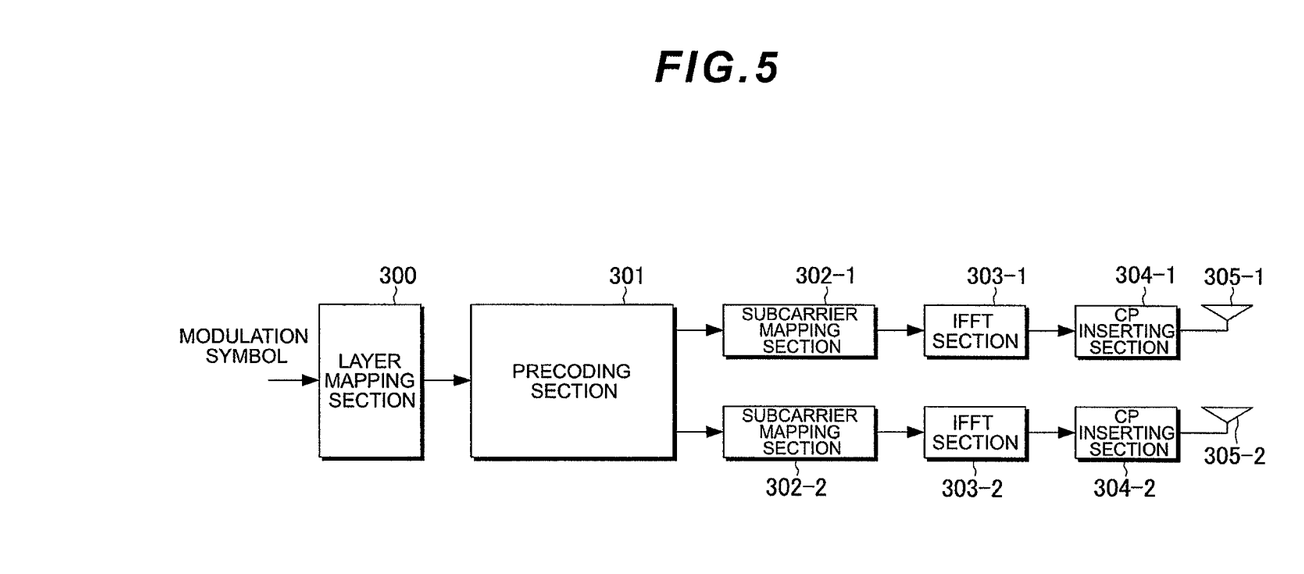
FIG. 5 is a diagram illustrating an example of a concept of precoding.

FIG. 5 is a diagram illustrating an example of the concept of precoding. The precoding is effective, particularly, when there is a spatial correlation. In the LTE, the precoding has been already employed in the OFDM of the downlink. When the number of transmitting antennas is two, 4 types of precoding matrices have been defined, and when the number of transmitting antennas is four, 16 types of precoding matrices have been defined. In FIG. 5, it is assumed that the number of streams to transmit (signals to simultaneously transmit, which is also called the number of layers) is one, and the number of transmitting antennas is two. As a modulation symbols to transmit, signals corresponding to the number of streams are parallelized by a layer mapping section 300. Here, since the number of layers is one, the signal is output "as is". The signal of each layer which is output is input to a precoding section 301, and pre-coded signals corresponding to the number of transmitting antennas are output from the precoding section 301. Here, as the precoding matrix, for example, when the number of layers is one and the number of transmitting antennas is two, any one of the following four types is selected.

[Equation 9]

$$\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix} \quad (9)$$

When the number of layers is one, a first row is a weight of a transmitting antenna 1, a second row is a weight of a transmitting antenna 2, and the weight is multiplied in the frequency domain. Particularly, in the case of the downlink, by changing the pre-coding in units of a plurality of frequency blocks called a sub band, precoding appropriate for the frequency characteristic can be implemented (this is also called frequency selection precoding or the like). Thereafter, subcarriers are arranged in frequencies allocated by subcarrier mapping sections 302-1 and 302-2 and transformed into temporal signals by IFFT sections 303-1 and 303-2. Then, CPs are inserted by CP inserting sections 304-1 and 304-2, and are transmitted from transmitting antennas 305-1 and 305-2.

The above example is the case of the OFDM, but when it is applied to the uplink, the peak power has to be considered similarly to the transmission diversity. A frequency and a time is one to one, the precoding matrix is generally configured with a unitary matrix in which orthogonal vector units are arranged or with a matrix of apart thereof. Thus, a wave form is not distorted. In this regard, when the power usage efficiency is considered, it is necessary to apply precoding which is the same in the frequency. Thus, the present invention is further characterized in that frequency selective precoding of changing precoding in frequency allocation units based on frequency allocation information and wideband precoding in which the same precoding matrix is used in the whole transmission band are switched.

Figure 6:
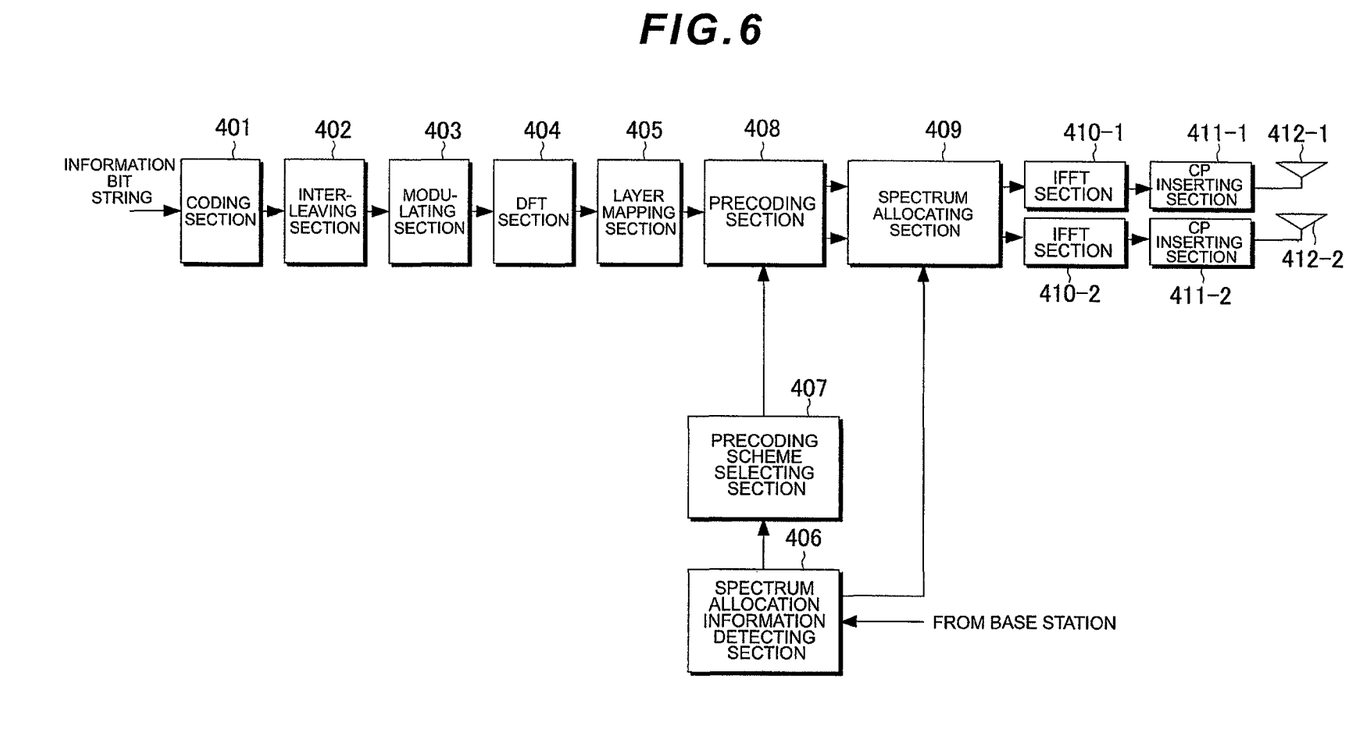
FIG. 6 is a diagram illustrating an example of a wireless transmitter according to a third embodiment.

FIG. 6 is a diagram illustrating an example of a wireless transmitter according to the third embodiment. The wireless transmitter includes a coding section 401, an interleaving section 402, a modulating section 403, a DFT section 404, a layer mapping section 405, a spectrum allocation information detecting section 406, a precoding scheme selecting section 407, a precoding section 408, a spectrum allocating section 409, IFFT sections 410-1 and 410-2, CP inserting sections 411-1 and 411-2, and transmitting antennas 412-1 and 412-2. The coding section 401, the interleaving section 402, the modulating section 403, the DFT section 404, the IFFT sections 410, the CP inserting sections 411, and the transmitting antennas 412 are the same as in the first embodiment, and a description thereof will not be repeated. Here, a description has been made in connection with the case in which the number of layers is one and the number of transmitting antennas is two, but even when the number of layers is two or more and the number of transmitting antennas is two or more, the same processing can be performed. Since the processing is substantially the same, the aforementioned case falls within the present invention.

The spectrum allocation information detecting section 406 detects spectrum allocation information related to frequency allocation of the transmitting signal from the control information (for example, PDCCH in the case of the LTE) notified via the downlink from the base station and outputs the detected information to the precoding scheme selecting section 407 and the spectrum allocation section 409. The precoding scheme selecting section 407 selects the frequency selective precoding when the spectrum allocation is not consecutive (clustered DFT-S-OFDM) but selects the wide band precoding when spectrum allocation is consecutive (SC-FDMA). Then, the precoding section 408 performs precoding selected by the precoding scheme selecting section 407. At this time, as to which precoding is selected, an arbitrary precoding matrix is selected in the case of an open loop (OL) in which precoding information is not fed back by the base station, and precoding is applied using a precoding matrix indicator (PMI) notified as the control information supplied from the base station (not shown) in the case of a closed loop (CL). At this time, a frequency unit of the case of frequency selective precoding may be the size, called the sub band, the same as in the LTE may be acceptable or an interval between subcarriers.

The substance relates to whether to use precoding matrices having different frequencies or to use precoding matrices having the same frequency according to whether the spectrum allocation information is consecutively arranged or dispersedly arranged. Thus, even when the precoding scheme is selected by the base station, it is substantially the same. Further, since the power headroom representing the transmission power margin, information such as the CM, the PAPR, and the like which have been described in the first embodiment can be used, it is substantially the same and is included in the present invention.

As described above, according to the present embodiment, by switching the transmission diversity according to the transmission power, the transmission diversity can be efficiently applied in terms of the transmission power of the wireless communication system, the power consumption, and the transmission performance.

EXPLANATIONS OF REFERENCE NUMERALS

10: coding section
11: interleaving section
12: modulating section
13: DFT section
14: transmission power deciding section
15: transmission diversity scheme selecting section
16: switching section
17: SFBC coding section
18: CDD section
19-1, 19-2: IFFT section
20-1, 20-2: CP inserting section
21-1, 21-2: transmitting antenna
90: receiving antenna
100: CP removing section
101: reception power measuring section
102: transmission power information generating section
103: FFT section
104: transmission diversity scheme detecting section
105: SFBC decoding section
106: equalizing section
107: IDFT section
108: demodulating section
109: deinterleaving section
110: decoding section
201: coding section
202: interleaving section
203: modulating section
204: DFT section
205: spectrum allocating section
206: spectrum allocation information detecting section
207: transmission diversity scheme selecting section
208: switching section

209: SFBC coding section
210: CDD section
211-1, 211-2: IFFT section
212-1, 212-2: CP inserting section
213-1, 213-2: transmitting antenna
300: layer mapping section
301: precoding section
302-1, 302-2: subcarrier mapping section
303-1, 303-2: IFFT section
304-1, 304-2: CP inserting section
305-1, 305-2: transmitting antenna
401: coding section
402: interleaving section
403: modulating section
404: DFT section
405: layer mapping section
406: spectrum allocation information detecting section
407: precoding scheme selecting section
408: precoding section
409: spectrum allocating section
410-1, 410-2: IFFT section
411-1, 411-2: CP inserting section
412-1, 412-2: transmitting antenna
A: base station
B: first mobile station
C: second mobile station

The invention claimed is:

1. A mobile station comprising:
a transmitting section configured to and/or programmed to transmit transmission signals using one of a plurality of transmission schemes, the plurality of transmission schemes including at least a first transmission scheme and a second transmission scheme, wherein
in a case that the used transmission scheme is the first transmission scheme, the transmission signals are applied by an open loop (OL) in which precoding information is not fed back,
in a case that the used transmission scheme is the second transmission scheme, the transmission signals are applied by a closed loop (CL) for which a precoding matrix indicator (PMI) is fed back from the mobile station, and
a first peak-to-average power ratio (PAPR) characteristics of the first transmission scheme differs from a second PAPR characteristics of the second transmission scheme.

2. The mobile station according to claim 1, wherein the second transmission scheme is a clustered discrete Fourier transform spread orthogonal frequency division multiplexing (DFT-S-OFDM) scheme.

3. The mobile station according to claim 1, wherein the mobile station including one or more processor(s) and one or more memory device(s), wherein the one or more memory device(s) is configured to and/or programmed to store instructions that, when executed by the one or more processor(s), cause the one or more processor(s) to be configured to and/or programmed to function as the transmitting section.

4. A method for transmitting transmission signals, the method comprising:
transmitting the transmission signals using one of a plurality of transmission schemes, the plurality of transmission schemes including at least a first transmission scheme and a second transmission scheme, wherein
in a case that the used transmission scheme is the first transmission scheme, the transmission signals are applied by an open loop (OL) in which precoding information is not fed back,
in a case that the used transmission scheme is the second transmission scheme, the transmission signals are applied by a closed loop (CL) for which a precoding matrix indicator (PMI) is fed back from a mobile station, and
a first peak-to-average power ratio (PAPR) characteristics of the first transmission scheme differs from a second PAPR characteristics of the second transmission scheme.

5. A non-transitory computer-readable medium comprising computer-executable instructions for causing one or more processor(s) and/or memory to perform the method according to claim 4.

6. A base station comprising:
a receiving section configured to and/or programmed to receive signals transmitted, by a mobile station, using one of a plurality of transmission schemes, the plurality of transmission schemes including at least a first transmission scheme and a second transmission scheme, wherein
in a case that the used transmission scheme is the first transmission scheme, the transmission signals are applied by an open loop (OL) in which precoding information is not fed back,
in a case that the used transmission scheme is the second transmission scheme, the transmission signals are applied by a closed loop (CL) for which a precoding matrix indicator (PMI) is fed back from the mobile station, and
a first peak-to-average power ratio (PAPR) characteristics of the first transmission scheme differs from a second PAPR characteristics of the second transmission scheme.

7. The base station according to claim 1, wherein
the base station including one or more processor(s) and one or more memory device(s), wherein the one or more memory device(s) is configured to and/or programmed to store instructions that, when executed by the one or more processor(s), cause the one or more processor(s) to be configured to and/or programmed to function as the receiving section.

* * * * *